US010114746B2

(12) United States Patent
Pio

(10) Patent No.: US 10,114,746 B2
(45) Date of Patent: Oct. 30, 2018

(54) NONVOLATILE STORAGE USING LOW LATENCY AND HIGH LATENCY MEMORY

(75) Inventor: Federico Pio, Brugherio (IT)

(73) Assignee: Micron Technology, Inc., Boise, ID (US)

( * ) Notice: Subject to any disclaimer, the term of this patent is extended or adjusted under 35 U.S.C. 154(b) by 420 days.

(21) Appl. No.: 12/904,807

(22) Filed: Oct. 14, 2010

(65) Prior Publication Data

US 2012/0096246 A1   Apr. 19, 2012

(51) Int. Cl.
*G06F 12/06* (2006.01)
*G06F 12/02* (2006.01)
*G06F 3/06* (2006.01)

(52) U.S. Cl.
CPC ........ *G06F 12/0638* (2013.01); *G06F 3/0685* (2013.01); *G06F 3/0611* (2013.01); *G06F 3/0638* (2013.01); *G06F 12/0246* (2013.01); *G06F 2212/205* (2013.01)

(58) Field of Classification Search
None
See application file for complete search history.

(56) References Cited

U.S. PATENT DOCUMENTS

| 6,021,133 | A  |   | 2/2000  | Asghar |
| 6,839,823 | B1 | * | 1/2005  | See ....................... G06F 12/023 711/103 |
| 7,222,224 | B2 | * | 5/2007  | Woo et al. ..................... 711/167 |
| 7,584,335 | B2 | * | 9/2009  | Daniels ........................ 711/154 |
| 7,593,263 | B2 | * | 9/2009  | Sokolov et al. ......... 365/185.17 |
| 2005/0216552 | A1 | * | 9/2005 | Fineberg et al. ............. 709/203 |
| 2007/0033362 | A1 | * | 2/2007 | Sinclair ........................ 711/165 |
| 2007/0276882 | A1 | * | 11/2007 | Nishimura et al. ........... 707/203 |
| 2009/0248697 | A1 | * | 10/2009 | Richardson et al. ........... 707/10 |
| 2009/0326759 | A1 | * | 12/2009 | Hensel et al. .................. 701/33 |

OTHER PUBLICATIONS

Randall, Chip. Basic Stamp Computer Tutorial. Thomas Jefferson High School for Science and Technology [online], Oct. 1999 [retrieved on Sep. 23, 2015]. Retrieved from the Internet:< URL: https://www.tjhsst.edu/~jleaf/tec/stamp/sttutor1.htm>.*
"Interleave", http://dictionary.reference.com/browse/interleave, section 5, as captured on Mar. 26, 2015.

* cited by examiner

*Primary Examiner* — Edward J Dudek, Jr.
*Assistant Examiner* — Ralph A Verderamo, III
(74) *Attorney, Agent, or Firm* — Dorsey & Whitney LLP

(57) ABSTRACT

Nonvolatile storage includes first and second memory types with different read latencies. FLASH memory and phase change memory are examples. A first portion of a data block is stored in the phase change memory and a second portion of the data block is stored in the FLASH memory. The first portion of the data block is accessed prior to the second portion of the data block during a read operation.

18 Claims, 10 Drawing Sheets

NONVOLATILE STORAGE USING LOW LATENCY AND HIGH LATENCY MEMORY

FIELD

The present invention relates generally to memory devices, and more specifically to data storage and retrieval in nonvolatile memory.

BACKGROUND

FLASH memory is a type of nonvolatile memory that has gained in popularity in recent years. Examples of FLASH memory devices include thumb drives for transporting files between personal computing devices, memory sticks for use in digital cameras, and microSD cards for use in cellular telephones. Because FLASH memory devices are inexpensive, durable, and highly portable, it is likely that FLASH devices will continue to increase in popularity for the foreseeable future.

However, one drawback of FLASH memory is the delay in accessing data stored in the memory. This delay places limitations on the possible applications of FLASH memory devices. Thus, FLASH memory can be unacceptable for some execute-in-place (XiP) applications in which computer programs stored on the FLASH memory device are performed without copying the stored program into the host computer processor's random access memory. In these instances, especially those in which the XiP program is required to access the FLASH memory multiple times in order to carry out the program instructions, the accumulated delay can cause XiP programs to run unacceptably slow.

BRIEF DESCRIPTION OF THE DRAWINGS

Embodiments of the invention are illustrated by way of example and not limitation in the figures of the accompanying drawings, in which.

DESCRIPTION OF EMBODIMENTS

Figure 1:
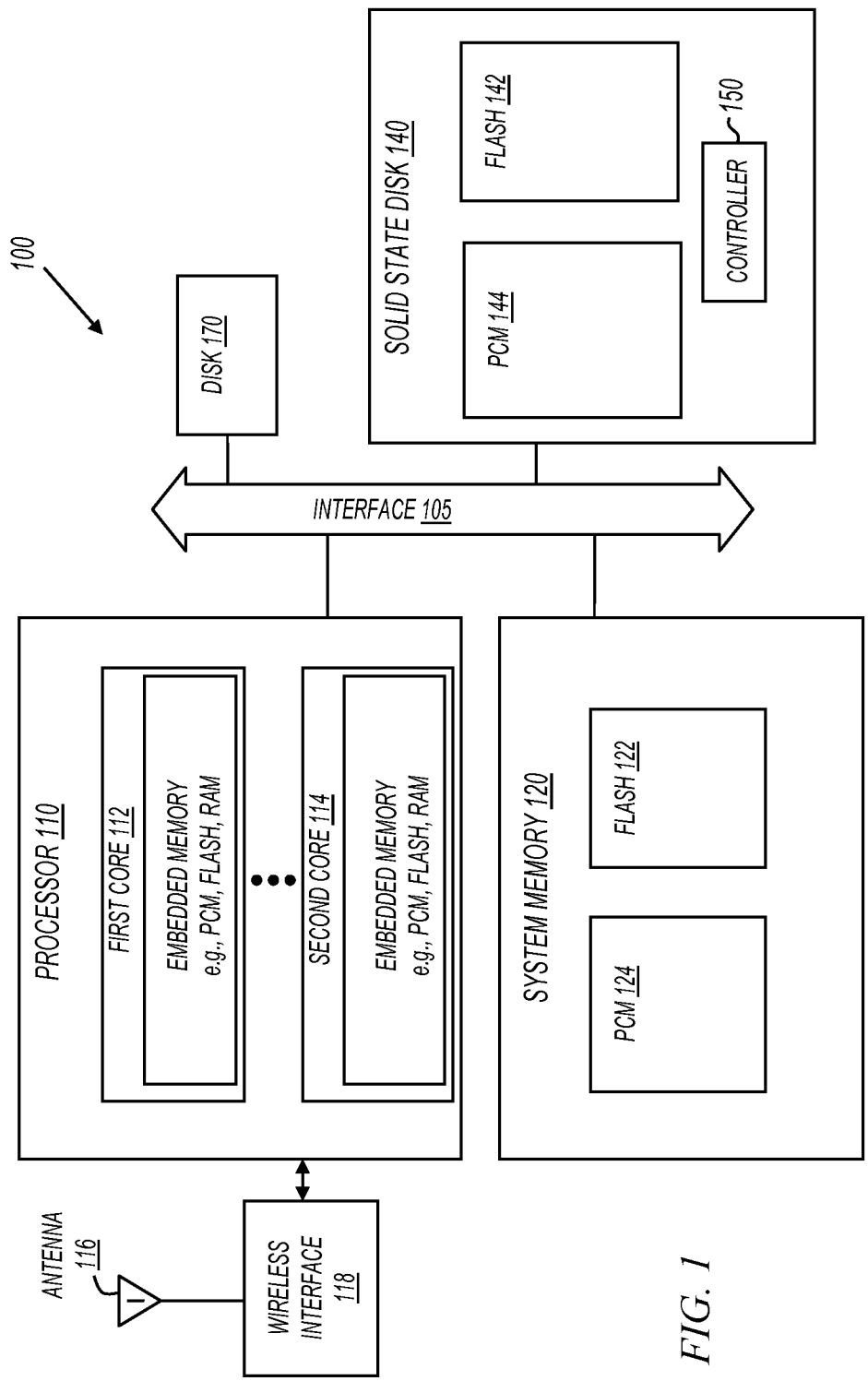
FIG. 1 shows an electronic system in accordance with various embodiments of the invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The terms "data block portion", "first portion of a data block", and "second portion of a data block" are used throughout the embodiments described herein and in the appended claims. These terms are intended to indicate any finite amount of storage used to organize computer-readable information, including computer program instructions, or "code", in a memory device. Thus, in some embodiments of the invention, a data block portion, a first portion of a data block, or a second portion of a data block may represent a comparatively small amount of data, perhaps as small as a single bit, or perhaps a larger file, such as a file that is 4 kB, 8 kB, or 16 kB in length. In other embodiments of the invention, these terms may represent a segment of a much larger data file, such as a file that is 1 MB, 2 MB, 4 MB, 1 GB, or larger.

Embodiments of the present invention may include apparatuses for performing the operations herein. An apparatus may be specially constructed for the desired purposes, or the apparatus may comprise a general purpose computing device selectively activated or reconfigured by a computer program stored in the device. Such a program may be stored on a computer readable medium, such as, but not limited to, any type of disk including floppy disks, optical disks, compact disc read only memories (CD-ROMs), magnetic-optical disks, read-only memories (ROMs), random access memories (RAMs), nonvolatile memories such as electrically programmable read-only memories (EPROMs), electrically erasable and programmable read only memories (EEPROMs), or FLASH memories, or any other type of media suitable for storing electronic instructions, and capable of being coupled to a system bus for a computing device.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicate that two or more elements are in either direct or indirect (with other intervening elements between them) physical or electrical contact with each other, and/or that the two or more elements co-operate or interact with each other (e.g. as in a cause an effect relationship).

While the following description consistently refers to phase change memory (PCM), and to FLASH memory, it is intended that they are only used as examples representative of any pair of nonvolatile memory types featuring a lower latency (exemplified by the PCM) and a higher latency (exemplified by the NAND FLASH memory) when accessed for retrieving data stored therein. Accordingly, the various embodiments of the invention encompass multiple memory types with different latencies, and not just PCM/FLASH.

FIG. 1 shows a system 100 in accordance with various embodiments of the present invention. System 100 may be any type of device that includes memory without departing from the scope of the present invention. For example, system 100 may be a computer or a mobile phone with nonvolatile memory. Also for example, system 100 may be a global positioning system (GPS) receiver or a portable media player with nonvolatile memory.

In the embodiment of FIG. 1, system 100 includes a wireless interface 118 coupled to antenna 116 to allow system 100 to communicate with other devices that communicate over-the-air. As such, system 100 may operate as a cellular device or a device that operates in wireless networks such as, for example, Wireless Local Area Networks (WLANs), WiMax and Mobile WiMax based systems, Wideband Code Division Multiple Access (WCDMA), and Global System for Mobile Communications (GSM) networks, any of which may or may not operate in accordance with one or more standards. The various embodiments of the invention are not limited to operate in the above-identified network types; this is simply a list of examples. It should be understood that the scope of the present invention is not limited by the types of, the number of, or the frequency of the communication protocols that may be used by system 100. Embodiments are not, however, limited to wireless communication embodiments. Other non-wireless applications can make use of the various embodiments of the invention.

In some embodiments, wireless interface 118 may include one or more stand-alone Radio Frequency (RF) discrete or integrated analog circuits. In other embodiments, wireless interface 118 may be embedded within an integrated circuit that includes other components. For example, in some embodiments, wireless interface 118 may be included on a common integrated circuit with processor 110.

Processor 110 includes at least first core 112; in the embodiment depicted in FIG. 1 processor 110 also includes second core 114, and each core may include memory. For example, first core 112 may include volatile or nonvolatile memory such as PCM, FLASH, or RAM. Each core may include any combination of different types of memory without departing from the scope of the present invention. Processor 110 may execute instructions from any suitable memory within system 100. For example, any memory within a processor core, or any of the memory devices within system memory 120, may be considered a computer-readable medium that has instructions stored that when accessed cause processor 110 to perform according to embodiments of the invention.

First core 112 and second core 114 may also make use of Magnetic Random Access Memory (MRAM), which employs magnetic storage elements formed from two ferromagnetic plates located at an intersection of a row and column line and selected by a Magnetic Tunnel Junction (MTJ) device. Current imparted to the row line in one direction causes a magnetic field operative on the MRAM cell biasing the MRAM cell toward a binary state. Due to a magnetic tunnel effect, the electrical resistance of the memory cell changes based on the orientation of the fields in the two plates.

First core 112 and the second core 114 may also make use of Ferro-electric Random Access Memory (FRAM), which employs memory cells that may include one transistor and one capacitor. The capacitor includes ferroelectric material and a bi-stable atom in the ferroelectric material that is shifted to form two stable polarization states. Memory cell data may be written by positively or negatively orienting the dipoles of the ferroelectric material via an applied polarizing voltage. Data may be read by detecting the voltage of the bit line (BL) connected with the memory cell. Current feed circuits supply electric currents to the bit lines for a predetermined period from a start of a read operation, and read control circuitry senses the direction of the electric polarization as either a high or a low logic state. Each orientation is stable and remains in place even after the electric field is removed, preserving the data within the memory without periodic refresh.

Processor 110 is shown coupled to interface 105. Interface 105 provides communication between processor 110 and the various other devices coupled to interface 105. For example, processor 110 may communicate with memory devices in system memory 120, solid state disk (SSD) 140, as well as disk 170. Interface 105 can include serial and/or parallel buses to share information along with control signal lines to be used to provide handshaking between processor 110 and the various other devices coupled to interface 105.

In some embodiments of the invention, system 100 may not include disk 170. For example, in some mobile phone embodiments, disk 170 may not be present. However, in other embodiments of the invention, such as computer-based applications, disk 170 may be included.

System memory 120 includes FLASH memory 122 and phase change memory (PCM) 124. FLASH memory 122 stores information by storing charge on a floating gate in a Metal Oxide Semiconductor (MOS) transistor. The stored charge alters the threshold voltage of the transistor, and the difference in threshold voltage is "read" to determine whether the stored information is a "0" or a "1". In some embodiments, varying amounts of charge are stored on the floating gate to represent more than one bit of information per memory cell. This is sometimes referred to as Multi-Level Cell (MLC) FLASH. FLASH memory 122 may be any type of FLASH memory, including NOR FLASH memory, NAND single level cell (SLC) memory, or NAND multi-level cell (MLC) memory. In an example that accords with the embodiment of FIG. 1, it is contemplated that the latency in reading data from a NAND FLASH memory is on the order of 12 µs. Thus, for the example in which NAND FLASH memory is employed, when a read command and an address are present at the input of FLASH memory 122, there is approximately a 12 µs delay before the first data byte is present at the output of FLASH memory 122.

System memory 120 also includes phase change memory (PCM) 124. PCM is memory that stores information based on modifiable material properties, such as whether a material is in a crystalline or an amorphous state (phase). For example, in some embodiments, phase change memories include alloys of elements of group VI of the periodic table, such as Te or Se, that are referred to as chalcogenides or chalcogenic materials. Chalcogenides may be used advantageously in phase change memory cells to provide data retention and remain stable even after the power is removed from the nonvolatile memory. Taking the phase change material as $Ge_2Sb_2Te_5$ for example, two phases or more are exhibited having distinct electrical characteristics useful for memory storage. Phase change memory may be referred to as a Phase Change Memory (PCM), Phase-Change Random Access Memory (PRAM or PCRAM), Ovonic Unified Memory (OUM), Chalcogenide Random Access Memory (C-RAM), or by other suitable names.

In the embodiment of FIG. 1, it is contemplated that the latency in reading data from PCM 124 is perhaps 50 ns per byte, which corresponds to approximately 6 ns/bit. Thus, in this example, when a read command and an address are presented to the input of PCM 124, there is a 50 ns delay before a data byte is present at the output of PCM memory 124. Accordingly, the latency in reading data from PCM (50 ns) is substantially lower than the latency in reading data from NAND FLASH memory (12 µs). At least some advantages of the lower latency in reading data from PCM will become more apparent beginning with the description of the embodiment of FIG. 2.

Memory devices within system memory 120 may be packaged in any manner. For example, in some embodiments, FLASH memory 122 and PCM 124 may be combined in a stacking process to reduce the footprint on a board, packaged separately, or placed in a multi-chip package with the memory component placed on top of the processor. The FLASH memory 122 may comprise multiple FLASH memories to increase capacity and/or bandwidth.

Solid state disk (SSD) 140 includes FLASH memory 142, PCM 144, and controller 150. Controller 150 may be any type of controller, including a microcontroller, a microprocessor, or the like. SSD 140 emulates the operation of a hard disk. For example, in some embodiments, SSD 140 may appear to the rest of the system as a FAT (file allocation table) formatted hard drive. The FLASH memory 142 and/or PCM 144 may include multiple physical memory devices to increase capacity and/or bandwidth.

Although not shown in FIG. 1, a translation layer may be used within SSD 140 to map logical addresses in the read and write requests to physical addresses in FLASH memory 142 and PCM 144. In some embodiments, the logical addresses include sector numbers and the physical addresses include blocks within the FLASH memory. Various embodiments of the present invention store all or a portion of the translation layer in PCM 144. For example, in some embodiments, a translation table maintained in PCM 144 translates logical addresses to physical addresses within both FLASH memory 142 and PCM 144. Maintaining the translation table in PCM can simplify translation layer management in part because PCM 144 is not constrained by the block erase characteristics of FLASH memory. Further, in some embodiments, software modules that implement translation layer methods are stored in PCM, although this is not a limitation of the present invention.

In operation, SSD 140 receives read and/or write requests. The read requests are satisfied by reading contents from FLASH memory 142 and from PCM 144, and the write requests are satisfied by writing to FLASH memory 142 and to PCM 144. In some embodiments, the amount of data stored in PCM 144 is related to the latency in accessing the FLASH memory so that data is accessed starting with locations in PCM 144 and then followed by locations in FLASH. In some embodiments, in which computer program instructions (code) are stored in both FLASH memory 142 and PCM 144, instructions that immediately follow a GOTO, GOSUB, IF-THEN, FOR-NEXT, or other branch instruction are executed from PCM while subsequent instructions stored in FLASH memory are being accessed. In such embodiments, a first portion of a data block and a second portion of a data block are separated by the branch instruction. In other words, the program instruction forms a boundary between the first portion of a data block and the second portion of a data block.

Nonvolatile memory devices that include FLASH and PCM may be present anywhere in system 100. For example, in some embodiments, one or more of the cores within processor 100 may include FLASH memory and PCM, where data blocks are spread across the FLASH and the PCM. In these embodiments, the core that includes the nonvolatile memory may execute code stored across both the FLASH and PCM. The code may be executed in place (XiP).

Figure 2:
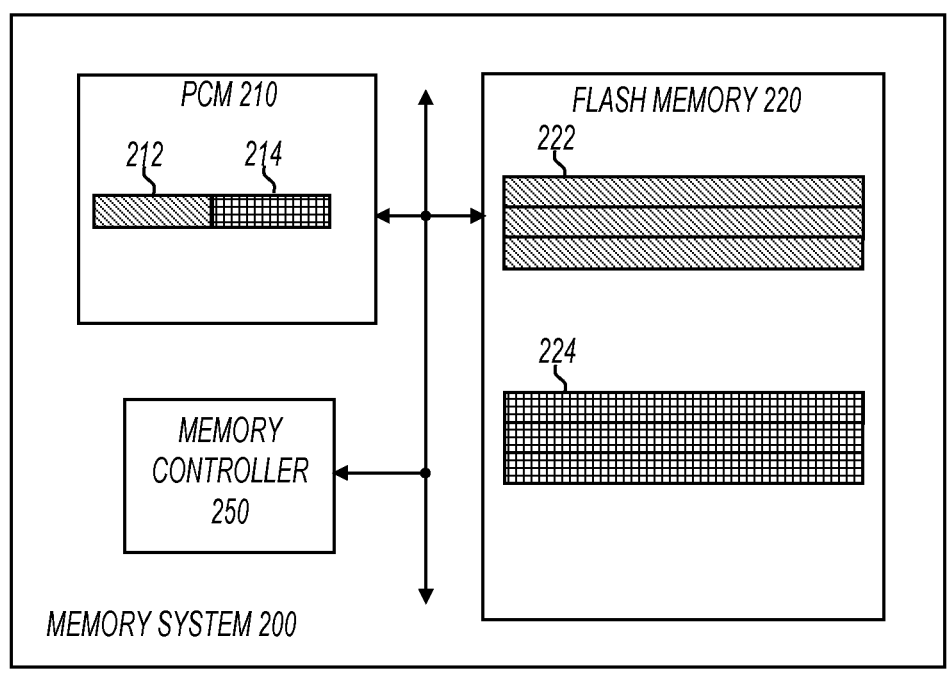
FIGS. 2 and 3 show memory systems in accordance with various embodiments of the invention.

FIG. 2 shows a memory system in accordance with various embodiments of the invention. In FIG. 2, memory system 200 includes PCM 210 and FLASH memory 220. Located within PCM 210 are data block portions 212 and 214. Located within FLASH memory 220 are data block portions 222 and 224. As indicated by the fill patterns used to show data block portions 212 and 222, data block portion 222 represents a continuation of data block portion 212. Additionally, data block portion 224 represents a continuation of data block portion 214. Further, it is contemplated that data block portions within FLASH memory 220 are much larger than the data block portions in PCM 210, although this is not a limitation of the present invention.

Memory controller 250, which may function in a manner similar to that of controller 150, interfaces with both PCM 210 and FLASH memory 220 by way of an internal memory bus. There is no limitation as to the form factor that memory system 200 may assume. Thus, for example, memory system 200 may be a memory card compatible with a bus internal to a personal computer. In other examples, memory system 200 may be a microSD card, a memory stick, a MultiMediaCard (MMC), an embedded MMC (eMMC), or any other type of storage media. Further, memory controller 250 may include a universal serial bus (USB) interface, although this is not a limitation of the present invention.

In the embodiment of FIG. 2, memory controller 250 receives read and write access commands from an external device such as first and second core processors 112 and 114 of FIG. 1. The access commands may take any form. For example, if memory system 200 operates as a solid-state disk, the access commands may be disk access commands to read data from or to write data to the solid-state disk. In other embodiments, the access commands may be other than disk access commands. The access commands include logical addresses, with FLASH memory 220 and PCM 210 being addressed using physical addresses. Memory controller 250 maps logical addresses received in the access commands to physical addresses in the FLASH memory and the PCM.

As previously mentioned herein, it is contemplated that the latency in reading data from PCM 210 is much lower than the latency in reading data from FLASH memory 220. Thus, when data block portions within PCM 210 are sized appropriately, a read command issued from memory controller 250 to PCM 210 and FLASH memory 220 may result in the entire contents of data block portion 212 being output from memory system 200 before the first byte of data block portion 222 is present at the output of memory system 200. The size of an exemplary data block portion stored in PCM (such as data block portion 212) can be calculated as a function of the latency in reading data from FLASH memory 220 using the following relation:

$$\text{PCM Size} = \text{FLASH } t_{read}/(\text{PCM effective } t_{out}/\text{bit}) \quad (1)$$

Thus, in an example using the above relation, if the NAND FLASH memory latency is 12 µs and if the effective read latency for the PCM is 6 ns/bit (50 ns per data byte) then, $$\begin{aligned}
\text{PCM size} &= \text{FLASH } t_{read}/(\text{PCM effective } t_{out}/\text{bit}) \quad (2)\\
&= 12 \text{ µs}/(6 \text{ ns/bit})\\
&= 2 \text{ kb}\\
&\approx 256 \text{ bytes}
\end{aligned}$$

Accordingly, for this example, when memory controller 250 is requested to read the file represented by data block portion 212 and data block portion 222, data block portion 212 is first read from low-latency PCM 210 followed by reading data block portion 222 from FLASH memory 220. In this example, data block portion 212 having a capacity of 256 bytes is sufficient to ensure the uninterrupted read of the data file represented by data block portions 212 and 222.

In another example in which the PCM is operated in a burst output mode having a PCM effective $t_{out}$ of 10 ns/data byte, a suitable PCM size can be calculated as:

$$\begin{aligned}
\text{PCM size} &= \text{FLASH } t_{read}/(\text{PCM effective } t_{out}/\text{bit}) \quad (3)\\
&= 12 \text{ µs}/(10 \text{ ns/data byte})\\
&\approx 1.2 \text{ kB}
\end{aligned}$$

Accordingly, for this example, data block portion 212 having a capacity of 1.2 kB would be sufficient to ensure the uninterrupted read of the data file represented by data block portion 212 and 222. As in the previous example, data block portion 212 is first read from low-latency PCM 210 followed by reading data block portion 222 from FLASH memory 220. In both embodiments, the size of data block portion 212 in the phase change memory is determined so that accessing a portion of a data block from the phase change memory occurs prior to a portion of a data block from the NAND FLASH memory being available for output.

Although only two data block portions are shown as being stored in PCM 210, embodiments of the invention may permit numerous other data block portions to be stored in PCM 210 as well. Each of the stored data block portions may represent an initial portion of a file in which the remainder of each file is stored in FLASH memory 220. In one embodiment of the invention, the size of data block portions 212 and 222 as well as 214 and 224 are occasionally adjusted by memory controller 250. For example, in some embodiments, the size of the data block portion stored in PCM memory is written to the PCM during data programming, so that during a read operation, the memory controller accesses and outputs the correct amount of data from the data block portion stored in PCM before outputting the data block portion stored in FLASH. It is noted that the dimensions of block portions, i.e. size of portions 212 and 214 in the PCM memory or portions 222 and 224 in the FLASH memory, may be different, also within the same memory. Additionally, in some embodiments of the invention, frequently-updated information, such as log files, may also be written to PCM 210. This minimizes the need to perform time-consuming operations in FLASH memory 220 and additionally avoids the need to make unnecessary writes to the FLASH memory.

The various components shown in FIG. 2 may be packaged in any manner. For example, in some embodiments, memory controller 250 and FLASH memory 220 are fabricated on the same semiconductor substrate. In other embodiments, PCM 210 is fabricated on a common substrate with FLASH memory 220 and memory controller 250. In other embodiments, controller 250 and FLASH memory 220 are fabricated on one substrate, and PCM 210 is fabricated on a second substrate. In other embodiments, the two substrates are stacked prior to packaging in memory system 200.

Figure 3:
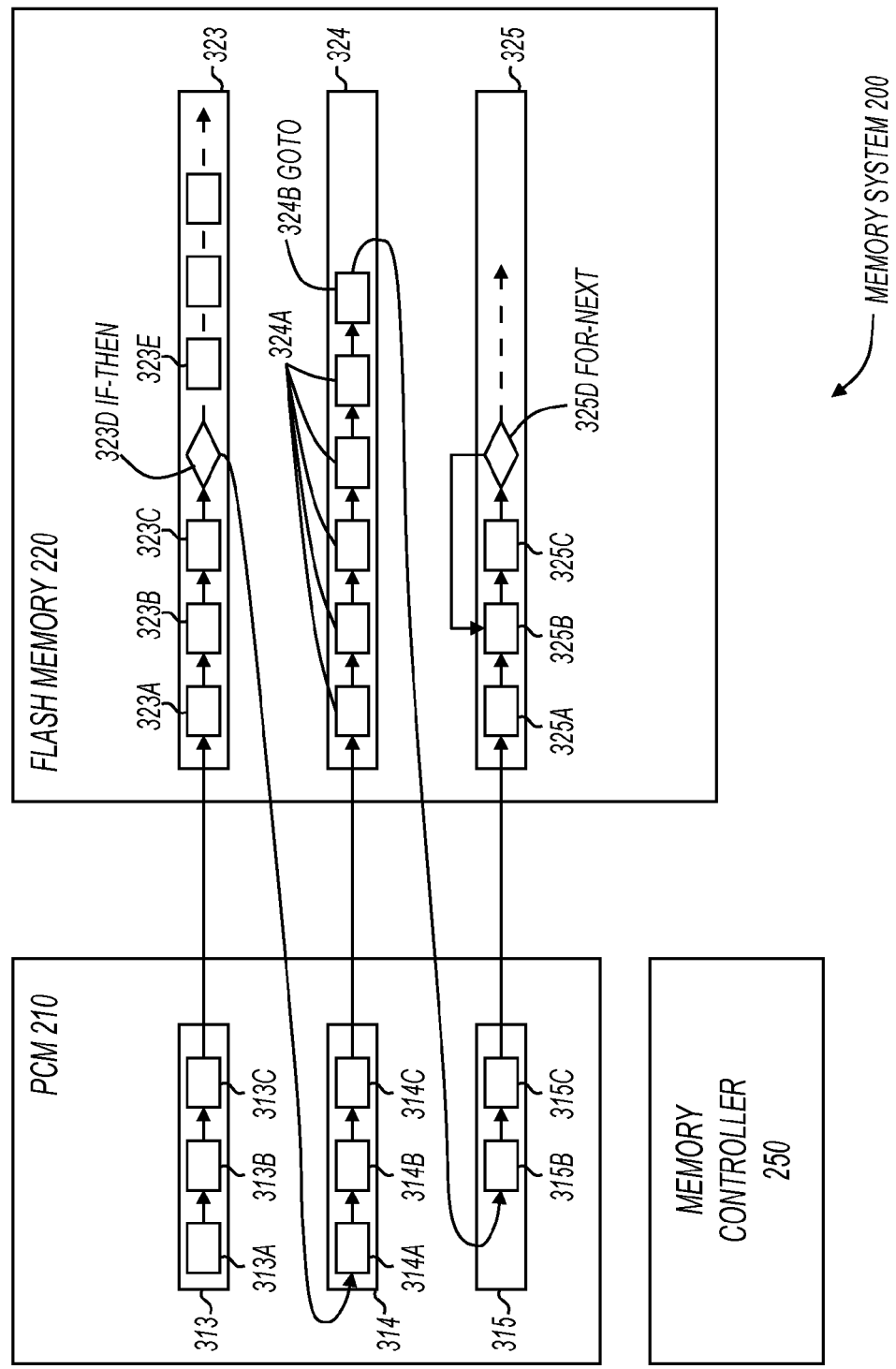

FIG. 3 shows a memory system in accordance with various embodiments of the present invention. In FIG. 3, memory system 200 includes memory controller 250, PCM 210, and FLASH memory 220 in a manner similar to that of FIG. 2. In FIG. 3, the interface between memory controller 250, PCM 210, and FLASH memory 220 is not explicitly shown for the sake of clarity. In PCM 210, data block portion 313 stores a portion of a computer program that includes computer instructions 313A, 313B and 313C. In FLASH memory 220, data block portion 323 stores computer instructions 323A-E that belong to a portion of the computer program subsequent to instructions 313A-C. Similarly data-block portion 314 (with instructions 314A, 314B and 314C) is stored in PCM memory 210 and its continuation data-block portion 324 (with instructions 324A and 324B) is stored in Flash memory 220; data-block portion 315 (with instructions 315B and 315C) is stored in PCM memory 210 and its continuation data-block portion 325 (with instructions 325A, 325B, 325C and 325D) is stored in Flash memory 220.

IF-THEN instruction 323D, GOTO instruction 324B, and FOR-NEXT instruction 325D, are collectively be referred to herein as "branch" instructions. Branch instructions are any instructions that may cause a change in computer program control flow. A branch instructions may be a conditional branch instruction (as in IF-THEN or FOR-NEXT) or may be an unconditional branch instruction (as in GOTO or GOSUB). Memory locations that store data block portion 313, 314 or 315 (in PCM) and data block portion 323, 324 or 325 (in FLASH) may include the memory locations that previously stored data block portions 212, 214, 222, and 224 of FIG. 2. As shown in FIG. 3, the memory locations store computer program instructions, although this is not a limitation of the present invention.

The computer program instructions stored in memory system 200 begin with instructions 313A, 313B, and 313C stored at memory locations in PCM 210. In the embodiment of FIG. 3, the initial instruction (or instructions) of the computer program are executed from PCM 210 so as to reduce the latency in beginning program execution. When instructions 313(A-C) in PCM are accessed, the FLASH memory is also triggered for reading instructions 323(A-E). Thus, execution of the program begins with performing instructions from PCM 210 during a time period between the FLASH memory receiving a read instruction and the FLASH memory transmitting the requested data or, in these embodiments, executing the appropriate computer program instruction. After performing instructions 313(A-C), and perhaps additional instructions from PCM 210, program control continues with instructions 323(A-C) from FLASH memory 220. After executing instruction 323C, IF-THEN instruction 323D is executed. As a result of performing a conditional branch associated with IF-THEN instruction 323D, program control either continues with instruction 323E from FLASH memory 220, or continues with instruction 314A from PCM 210.

When instructions 314(A-C) in PCM are accessed, the FLASH memory is also triggered for reading instructions 324 (A and B). Thus, execution of the program continues with performing instructions from PCM 210 during a time period between the FLASH memory receiving a read instruction and the FLASH memory transmitting the requested data.

After executing instructions 314(A-C) from PCM 210, program control again moves to instructions stored in FLASH memory 220 to execute instructions 324A. After instructions 324A, program control encounters an unconditional branch instruction (GOTO instruction 324B). Although shown as a GOTO instruction in FIG. 3, instruction 324B may represent any unconditional branch instruction such as a GOSUB instruction, which returns the program control to instructions in FLASH memory 220 that follow instruction 324B.

The GOTO instruction 324B causes program control to continue at instruction 315B within data block portion 315 in PCM 210. When instructions 315 (B and C) in PCM are accessed, the FLASH memory is also triggered for reading instructions 325(A-D). Thus, execution of the program continues with performing instructions from PCM 210 during a time period between the FLASH memory receiving a read instruction and the FLASH memory transmitting the requested data.

After instructions 315B and 315C are performed, program control again returns to instructions stored in data block portion 325 in FLASH memory 220. Instructions 325(A-C) are performed, and then FOR-NEXT instruction 325D is performed. In the embodiment of FIG. 3, FOR-NEXT instruction 325D is a conditional branch instruction that causes a particular instruction or set of instructions to be performed a certain number of times. In one example, in the event that memory 220 is NAND FLASH memory, the FOR-NEXT loop represented by instruction 325D may be fully contained within the NAND FLASH memory if the NAND device supports the output of a buffered datum at any of memory locations within block portion 325. Generally speaking, branch instructions within higher latency memory may redirect program execution to memory locations within the higher latency memory or to memory locations within lower latency memory. Branching to locations within higher latency memory may still be performed quickly if instructions from those locations are still buffered.

Figure 4:
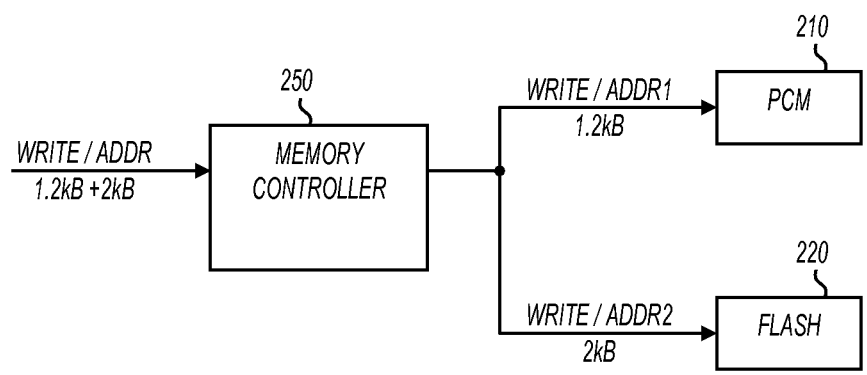
FIG. 4 shows a controller driving PCM and FLASH memory during a write operation in accordance with various embodiments of the invention.

FIG. 4 shows a controller driving both PCM and FLASH memory in accordance with various embodiments of the invention. In FIG. 4, when controller 250 receives a write instruction and an address, controller 250 divides the incoming data block into a first portion for storage in PCM 210 and a second portion for storage in FLASH memory 220. In the example of FIG. 4, the incoming data is divided into a 1.2 k-byte portion for storage in PCM 210 and a 2 kB portion for storage in FLASH memory 220. (In this example, the size of PCM 210 is calculated according to equation 3, which has been previously discussed herein.) Controller 250 may perform the aforementioned write operations to PCM 210 and flash memory 220 in an interleaving manner so as to exploit the write waiting time of PCM 210.

Figure 5:
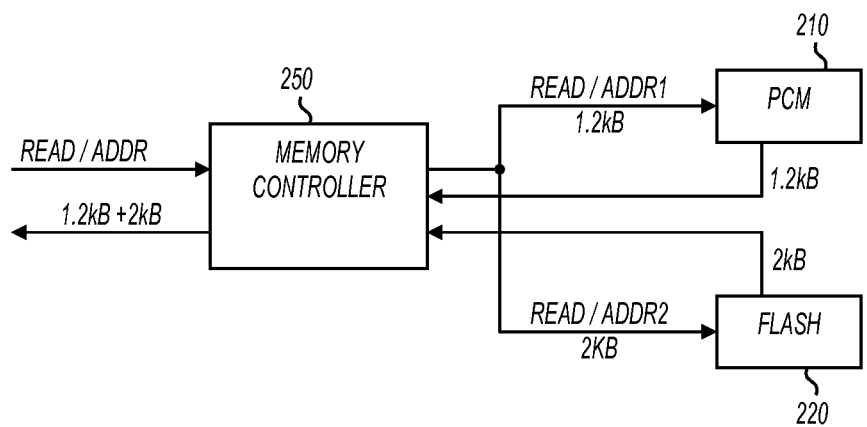
FIG. 5 shows a controller responding to a read request in accordance with various embodiments of the invention.

FIG. 5 shows a controller responding to a read request in accordance with various embodiments of the invention. When controller 250 of FIG. 5 receives a read request and address information, the controller triggers both the PCM and the FLASH memory to begin read operations from their respective internal addresses. Accordingly, controller 250 commences reading from low-latency PCM 210 beginning at a first address (ADDR1), which may begin transmitting data after a random access time of perhaps 50 ns operating at a 10 ns/B burst rate. After reading from PCM 210, controller 250 commences reading from higher-latency (perhaps 12 μs) FLASH memory 220 beginning at a second address (ADDR2). In this example, 1.2 kB are read from PCM 210 followed by a 2 kB read from FLASH memory 220. This results in an uninterrupted output stream from controller 250 with very low latency and high bandwidth. Although FIG. 5 shows data from PCM 210 and FLASH memory 220 being read through controller 250, in other embodiments of the invention, the data may be presented directly to a shared or common bus structure that does not pass through controller 250. Further, although FIGS. 4 and 5 show PCM and FLASH memory as examples, the various embodiments of the present invention encompass any memory types with different latencies.

Figure 6:
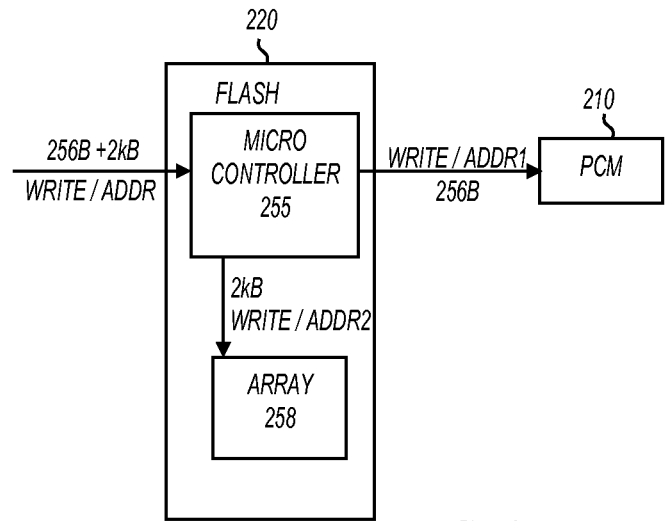
FIGS. 6-7 show a microcontroller onboard a FLASH memory device in accordance with various embodiments of the invention.
Figure 7:
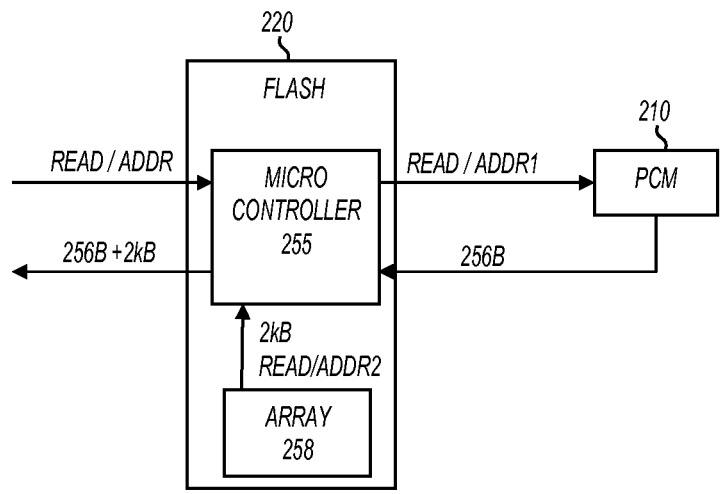

FIG. 6-7 show a microcontroller onboard a FLASH memory device in accordance with various embodiments of the invention. In FIG. 6, microcontroller 255 is programmed so as to forward to PCM 210 an initial portion of the incoming data. While writing to PCM 210 beginning at a first address (ADDR1), microcontroller 255 addresses array 258 (starting at ADDR2) with the remainder of the data to be stored. In this embodiment, microcontroller 255 stores the initial 256 bytes into PCM 210 and stores the remaining 2 kB in array 258 of FLASH memory 220. (In this example, the size of PCM 210 is calculated according to equation 2, which has been previously discussed herein.)

In FIG. 7, microcontroller 255, onboard a FLASH memory device, is shown responding to a read request. In this embodiment, microcontroller 255 forwards to low-latency PCM 210 a read request along with a starting address (ADDR1). Without delay, microcontroller 255 additionally triggers a read of FLASH memory array 258 beginning at a second address (ADDR2). After data from PCM 210 has been output from microcontroller 255, data from array 258 follows. With the initial portion of data being read from low latency PCM 210 and followed by data from FLASH memory array 258 and uninterrupted data stream can be present at the output of microcontroller 255.

Figure 8:
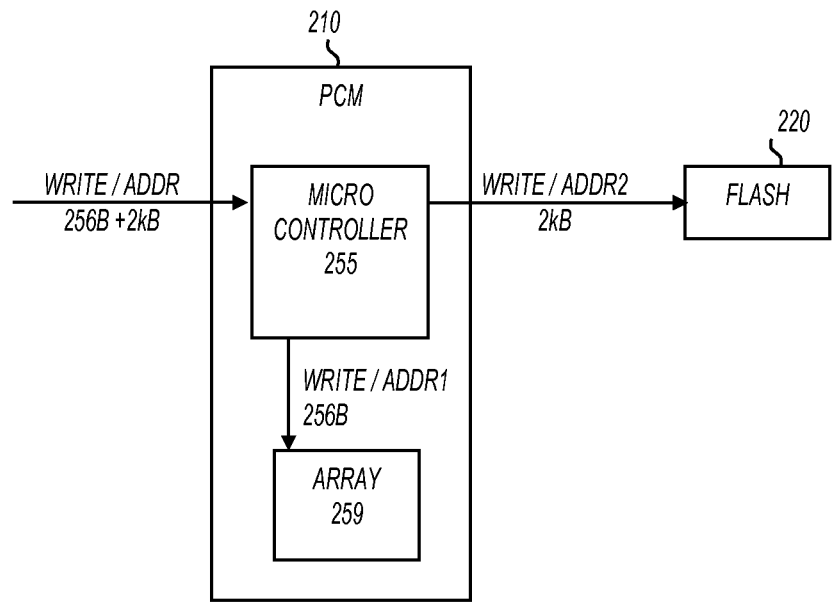
FIGS. 8-9 show a microcontroller onboard a PCM device in accordance with various embodiments of the invention.
Figure 9:
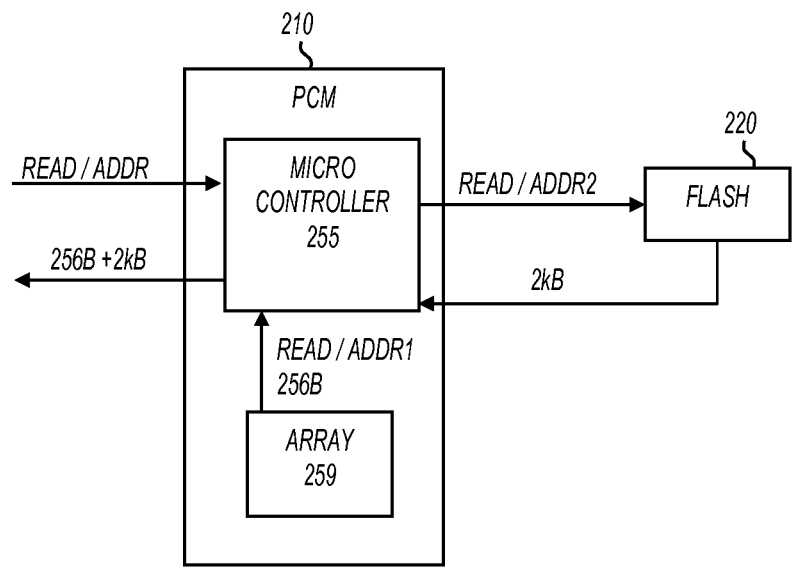

FIGS. 8-9 show a microcontroller 255 embedded in a PCM device in accordance with various embodiments of the invention. In the embodiment of FIG. 8, when microcontroller 255 receives a write request along with address information, the microcontroller forwards the initial portion of the received data (256 bytes) to PCM array 259 beginning at a first address (ADDR1) while the remainder of the received data (2 kB) is written to FLASH memory 220 starting at a second address (ADDR2).

In the embodiment of FIG. 9, microcontroller 255, embedded in a PCM device, receives a read request and address data. In this embodiment, microcontroller 255 immediately requests data from the appropriate address (ADDR1) of array 259 of PCM 220. After the initial portion (256B) of the requested data from PCM array 259 has been read, data from FLASH 220 memory (2 kB) is made available.

In some embodiments, the memory system splits a data block in a first portion stored in a lower latency PCM and second portion stored in higher latency FLASH. The system outputs a continuous stream of data featuring both low latency (that of PCM) and high bandwidth (that of FLASH). The size of the block portion stored in the low latency memory is set so that the time necessary to output the data stored therein substantially corresponds to or is longer than the latency period of the FLASH memory. When an access request at a data block logic address is received, both memories are triggered to retrieve respective data block portions that are finally combined in the output data stream (PCM block portion after the short latency, immediately followed by the FLASH block portion without or with minimum interruption).

In some embodiments, the translation layer information linking the first portion of the data block to the second portion of the data block, i.e. the logical address to respective starting addresses (ADDR1) in PCM and (ADDR2) in FLASH, is stored in a translation table in the phase change memory, but in other embodiments it is stored elsewhere. The information may be updated during programming to the memory system and the information is used when reading from the memory system.

Figure 10:
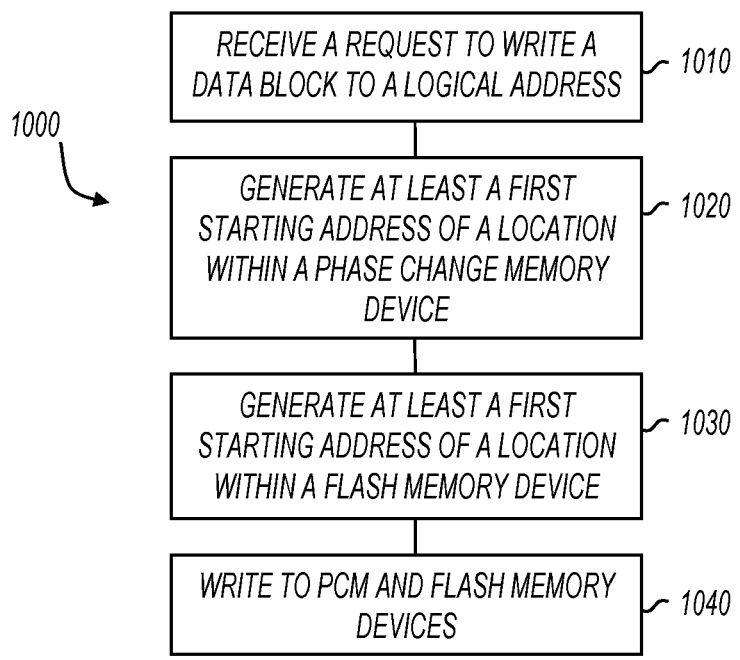
FIG. 10 shows a flow diagram for generating addresses in PCM and FLASH memory in accordance with various embodiments of the invention.

FIG. 10 shows a flow diagram for generating addresses in PCM and FLASH memories in accordance with various embodiments of the invention. In some embodiments, method 1000, or a portion thereof, is performed by a processor or controller coupled to or within a memory device or system. For example, method 1000 may be performed by processor 110 of FIG. 1, controller 150, controller 250, or microcontroller 255 previously described herein. The various actions in method 1000 may be performed in the order presented or may be performed in a different order.

Method 1000 is shown beginning at 1010 in which a request to write a data block to a logical address is received. In an embodiment that includes a solid state disk, the write request may specify a disk sector. In other embodiments, the logical address may correspond to an address other than a disk sector. At 1020, the received logical address is used to generate at least a first starting address for the first portion of the data block to be written. In an embodiment of the invention, a memory controller generates a starting address for a location in a phase change memory, such as PCM 210 as previously described herein. At 1030, at least a first starting address of a location within a FLASH memory device is generated. At 1040, a first portion of a data block is written to a PCM while a second portion of a data block is written to FLASH memory. In an embodiment of the invention 1040 may be performed in an interleaving manner so as to exploit the write waiting time of PCM.

In some embodiments of the invention, fewer than all of the actions of FIG. 10 are performed. For example, method 1000 may only include receiving a request to write a data block to a logical address (1010), generating at least the first starting address of a location within a phase change memory device (1020), and generating at least a first starting address of a location within a FLASH memory device (1030).

Figure 11:
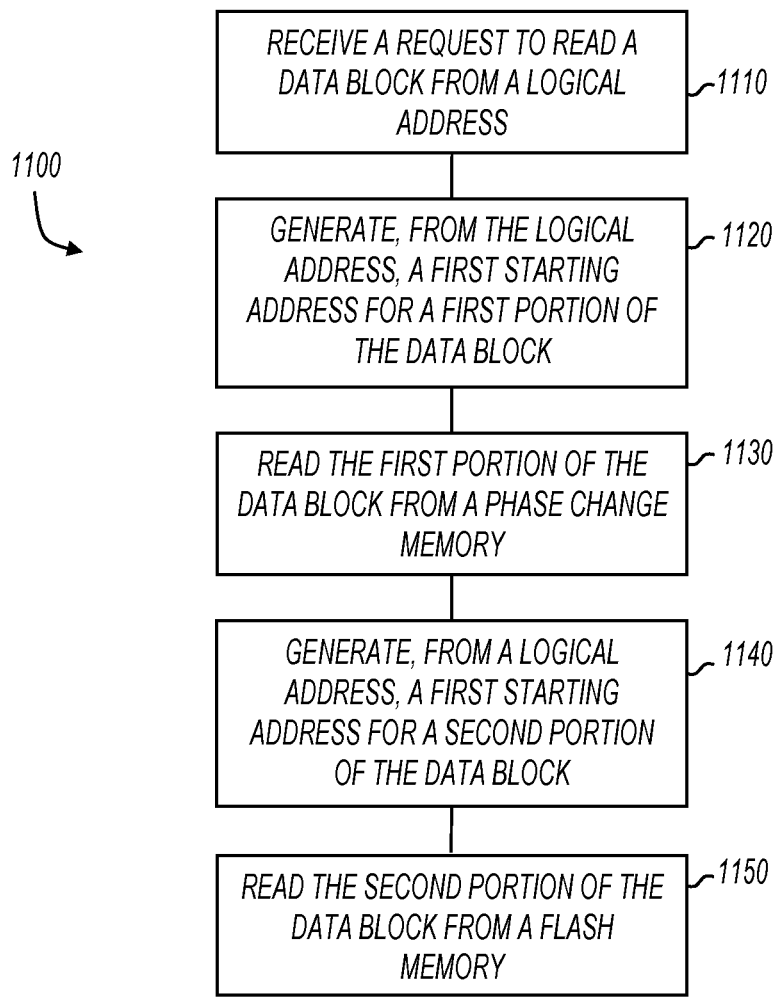
FIG. 11 shows a flow diagram for reading data block portions from PCM and FLASH memory in accordance with various embodiments of the invention.

FIG. 11 shows a flow diagram for reading data block portions from PCM and FLASH memory in accordance with various embodiments of the invention. In some embodiments, method 1100, or a portion thereof, is performed by a processor or controller coupled to or within a memory device or system. For example, method 1100 may be performed by processor 110 of FIG. 1, controller 150, controller 250, or microcontroller 255 previously described herein. The various actions in method 1100 may be performed in the order presented or may be performed in a different order.

The method of FIG. 11 begins at 1110, in which a request to read a data block from a logical address is received. At 1120, a first starting address for a first portion of the data block is generated from the logical address. At 1130, the first portion of the data block is read from a phase change memory using the first starting address generated in 1120. The method continues at 1140 in which a first starting address for the second portion of the data block is generated. In the embodiment of FIG. 11, the logical address received in 1110 is used to generate a first starting address for a second portion of the data block to be read. At 1150, the second portion of the data block is read from a FLASH memory.

Some embodiments of the invention include performing fewer than all of 1110, 1120, 1130, 1140, and 1150. For example, method 1100 may only the actions of receiving a request to read a data block from a logical address (1110), reading a first portion of the data block from a phase change memory (1130), and reading a second portion of the data block from a FLASH memory (1150) may be performed. In other embodiments, additional actions may be performed although not necessarily in the order presented in the description. For example, in one embodiment, the first portion of the data block is read from phase change memory during a time period between the FLASH memory receiving a read instruction and the FLASH memory transmitting the second portion of the data block.

Figure 12:
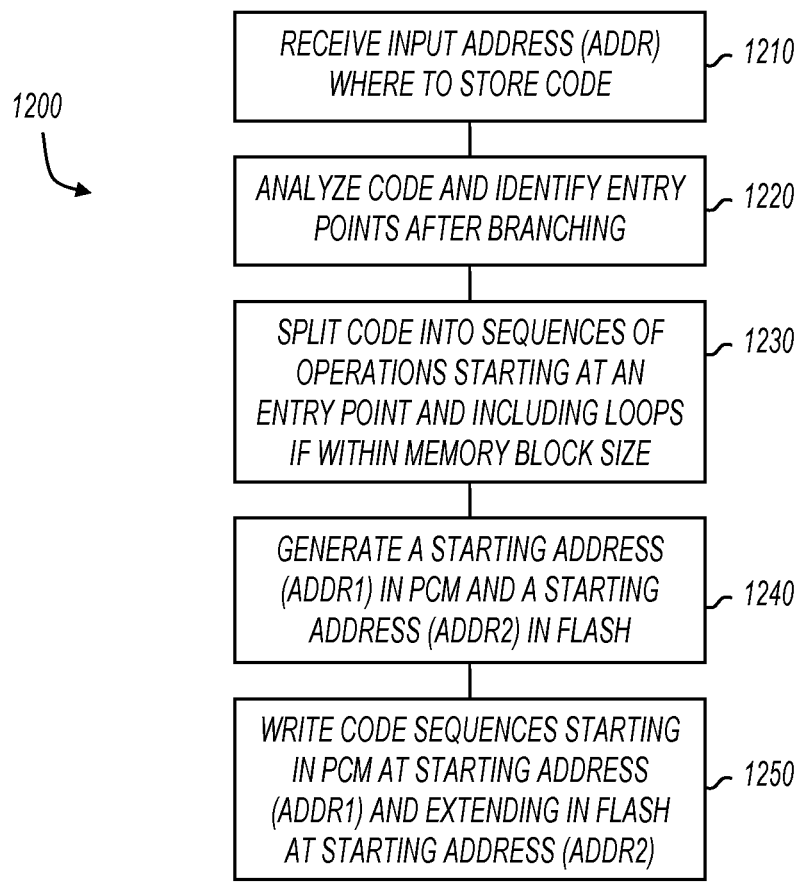
FIG. 12 shows a flow diagram for storing code sequences in PCM and FLASH memory in accordance with various embodiments of the invention.

FIG. 12 shows a flow diagram for storing code sequences in FLASH and PCM in accordance with various embodiments of the invention. In some embodiments, method 1200, or a portion thereof, is performed by a processor or controller coupled to or within a memory device or system. For example, method 1200 may be performed by processor 110 of FIG. 1, controller 150, controller 250, or microcontroller 255 previously described herein. The various actions in method 1200 may be performed in the order presented or may be performed in a different order.

Method 1200 begins at 1210 which includes receiving an input address where computer program instructions (i.e. code) are to be stored. At 1220, the computer program instructions are analyzed to identify appropriate entry points after branching operations are performed. In one example, in the event that a GOTO instruction is encountered, an embodiment of the invention may include storing instructions immediately following the GOTO instruction in PCM. This may permit these instructions to be executed with much lower latency than if these instructions were to be stored in FLASH memory. In another example, in the event that a GOSUB instruction is encountered, an embodiment of the invention may include storing instructions of the subroutine in PCM. This may permit, during program execution, fast branching to the subroutine instructions before program execution continues from the FLASH memory.

In various embodiments of the present invention, method 1200 determines how many instructions to write to PCM based on the relative latency of PCM and FLASH as described above with reference to equations (1)-(3). For example, in accordance with equation (2), 256 bytes of program instructions may be written to PCM after a branch instruction is encountered when writing program instructions to FLASH memory. Also for example, in accordance with equation (3), 1.2 kB of program instructions may be written to PCM after a branch instruction is encountered when writing program instructions to FLASH memory. The branch instruction therefore may redirect the program execution to a memory location within the PCM, so that low delay is introduced (the PCM memory has very low latency). In such embodiments, different portions of data blocks are separated by the branch instruction. In other words, the branch instruction forms a boundary between the first portion of a data block and the second portion of a data block.

At 1230, the computer program instructions are split into sequences of operations starting at particular entry points. Thus, as previously mentioned, a computer program may be split immediately after a GOTO instruction. Accordingly, programming instructions up to and including the GOTO instruction may be located in FLASH memory while programming instructions immediately after the GOTO instruction may be located in PCM. In another embodiment, in the event that program instructions that constitute a loop (such as a FOR-NEXT loop) are contained within a single data block, an outcome of 1230 may result in the FOR-NEXT code sequence being stored entirely in FLASH provided that the FLASH memory allows for readdressing the buffered data resulting from the loop.

The method continues at 1240, which includes generating a starting address (ADDR1) in PCM and a starting address (ADDR2) in FLASH memory. In one embodiment, the starting PCM address (ADDR1) may be followed by a small number of computer program instructions stored in PCM that allow the program to begin with minimal latency. At 1250, the code sequences are written to PCM beginning with the starting address generated in 1240 (ADDR1) and extending the code sequences in FLASH memory beginning at ADDR2. 1250 may include a much larger portion of the computer program being stored in FLASH memory.

Figure 13:
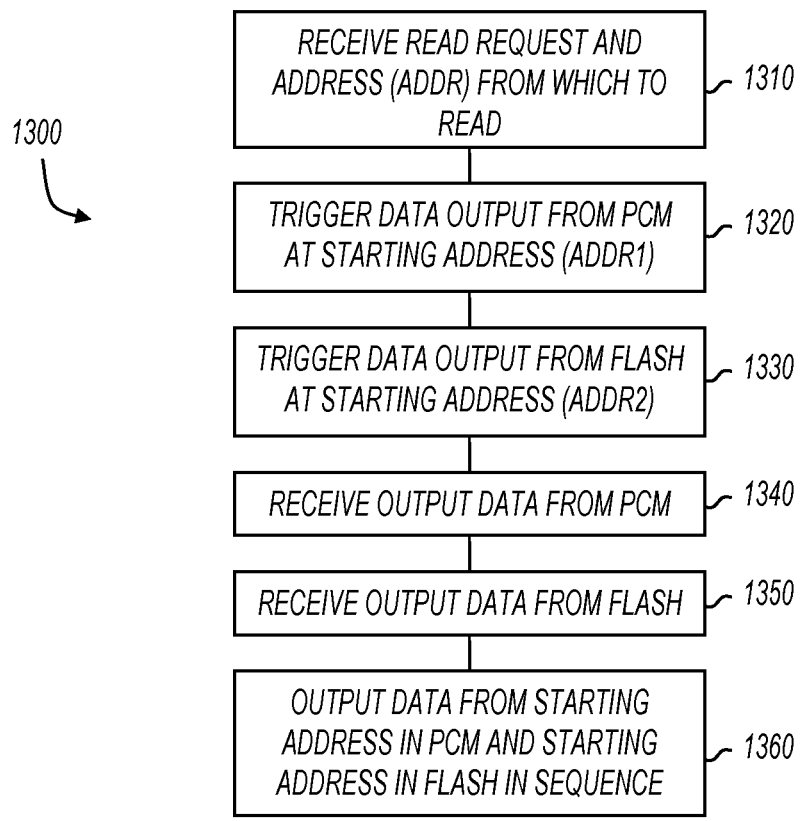
FIG. 13 shows a flow diagram for reading PCM and FLASH memories in accordance with various embodiments of the invention.

FIG. 13 shows a flow diagram for reading PCM and FLASH memories in accordance with various embodiments of the invention. In some embodiments, method 1300, or a portion thereof, is performed by a processor or controller coupled to or within a memory device or system. For example, method 1300 may be performed by processor 110 of FIG. 1, controller 150, controller 250, or microcontroller 255 previously described herein. The various actions in method 1300 may be performed in the order presented or may be performed in a different order.

FIG. 13 begins at 1310 in which a read request and an associated address (ADDR) is received perhaps by a memory controller. 1320 includes triggering a data output from PCM at a starting address (ADDR1). 1330 includes triggering a data output from FLASH memory starting at (ADDR2). At 1340, output data is received from PCM. At 1350, output data is received from FLASH. At 1360, data is output by the memory controller beginning at the starting PCM address and continuing with data output from a larger capacity FLASH memory.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
a first memory having a first read latency, wherein a first portion of a sequence of instructions and a size of the first portion is stored at the first memory; and
a second memory having a second read latency larger than the first read latency, wherein a second portion of the sequence of instructions is stored at the second memory and the size of the first portion and a size of the second portion are periodically adjusted by a memory controller based, at least in part, on the size of the first portion stored in the first memory, wherein the sequence of instructions follows a branch instruction stored at the second memory, wherein a request for each of the first portion of the sequence of instructions and the second portion of the sequence of instructions is sent without delay responsive to a branch of the branch instruction being taken, wherein the size of the first portion of the sequence of instructions is based, at least in part, on a ratio between latency in accessing the second memory and a latency in accessing the first memory, wherein the first and second portions of the sequence of instructions are written to the first and second memory, respectively, in an interleaving manner based on a write latency of the first memory.

2. The apparatus of claim 1, wherein the size of the first portion of the sequence of instructions is a ratio between latency in accessing the second memory and latency per bit in accessing the first memory.

3. The apparatus of claim 1, wherein the first memory comprises a phase change memory (PCM) and wherein the second memory comprises a FLASH memory and wherein the size of the first portion of the sequence of instructions stored at the PCM is determined so that receiving the first portion of the sequence of instructions from the PCM occurs prior to receiving the second portion of the sequence of instructions from the FLASH memory.

4. The apparatus of claim 1, wherein the branch instruction is one of the group consisting of: a GOTO, a GOSUB, an IF-THEN, and a FOR-NEXT instruction.

5. The apparatus of claim 1, wherein the second memory further includes a second sequence of instructions following the branch instruction, wherein the second sequence of instructions is requested responsive to the branch of the branch instruction not being taken.

6. The apparatus of claim 1, additionally comprising a controller that writes frequently-updated data to the first memory.

7. A method comprising:
writing first and second portions of a sequence of instructions to a phase change memory and a FLASH memory, respectively, in an interleaving manner based on a write latency of the phase change memory;
receiving a request to read the sequence of instructions from a logical address, wherein the request is provided responsive to a branch of a branch instruction being taken, wherein the branch instruction is stored at the FLASH memory;

responsive to the request and without delay, providing each of a first read request to the phase change memory and a second read request to the FLASH memory;

reading a first portion of the sequence of instructions from a phase change memory responsive to the first read request, wherein a size of the first portion of the sequence of instructions is stored at the phase change memory and is based, at least in part, on a ratio between latency in accessing the FLASH memory and a latency in accessing the phase change memory;

reading a second portion of the sequence of instructions from the FLASH memory responsive to the second read request; and adjusting the size of the first portion of the sequence of instructions and a size of the second portion of the sequence of instructions based, at least in part, on the size of the first portion stored at the phase change memory.

8. The method of claim 7, wherein the branch of the branch instruction redirects an execution of the sequence of instructions to starting with a location within the phase change memory and extending to one or more locations within the FLASH memory.

9. The method of claim 7, wherein the size of the first portion of the sequence of instructions is a ratio between the latency in accessing the FLASH memory and a latency per bit in accessing the phase change memory.

10. The method of claim 7, wherein reading the first portion of the sequence of instructions from the phase change memory occurs during a time period in between the FLASH memory receiving a read instruction and the FLASH memory transmitting the second portion of the sequence of instructions.

11. The method of claim 7, further comprising generating, from the logical address, a first starting address for the first portion of the sequence of instructions and a first starting address for the second portion of the sequence of instructions.

12. A non-transitory computer-readable medium having instructions stored thereon that when accessed, causes a controller to:

receive, at a microcontroller onboard a FLASH memory, a request to write a data block to a logical address, wherein the data block includes software code;

responsive to the request:

identify a sequence of instructions of the software code to be executed responsive to a branch of a branch instruction;

generate a first starting address of a location within a phase change memory;

generate a first starting address of a location within the FLASH memory;

store the branch instruction at the FLASH memory;

forward a first portion of the sequence of instructions at the phase change memory;

store the first portion of the sequence of instructions and a size of the first portion at the phase change memory starting with the first starting address of the location of the phase change memory, wherein a size of the first portion is based on a ratio between latency in accessing a FLASH memory and a latency in accessing the phase change memory;

store a second portion of the sequence of instructions at the FLASH memory starting with the first starting address of the location of the FLASH memory, wherein a process of storing the first portion of the sequence of instructions at the phase change memory is interleaved with a process of storing the second portion of the sequence of instructions at the FLASH memory based on a write latency of the phase change memory; and adjust the size of the first portion of the sequence of instructions and a size of the second portion of the sequence of instructions based, at least in part, on the size of the first portion stored at the phase change memory.

13. The non-transitory computer-readable medium of claim 12 wherein the instructions, when accessed additionally cause the controller to store at least a portion of a log file in the phase change memory.

14. The non-transitory computer-readable medium of claim 12 wherein the instructions, when accessed additionally cause the controller to adjust one of the group consisting of: a first starting address of the location within the phase change memory and a first starting address of the location within the FLASH memory.

15. The non-transitory computer-readable medium of claim 12, wherein the branch instruction is one of the group consisting of: a GOTO, a GOSUB, an IF-THEN, and a FOR-NEXT instruction.

16. The non-transitory computer-readable medium of claim 12 wherein the instructions, when accessed additionally cause the controller to write a second sequence of instructions subsequent to the branch instruction to a location within the FLASH memory, wherein the second sequence of instructions is to be executed responsive to the branch of the branch instruction not being taken.

17. The non-transitory computer-readable medium of claim 16 wherein the instructions, when accessed additionally cause the controller to write a first portion of a third sequence of instructions to the phase change memory and a second portion of the third sequence of instructions to the FLASH memory, wherein the third sequence of instructions precedes the branch instruction.

18. The non-transitory computer-readable medium of claim 12, wherein the size of the first portion of the sequence of instructions is a ratio between the latency in accessing the FLASH memory and a latency per bit in accessing the phase change memory.

* * * * *